(12) United States Patent
Nell et al.

(10) Patent No.: US 7,908,591 B1
(45) Date of Patent: Mar. 15, 2011

(54) MEMORY PROFILING

(75) Inventors: William Nell, Natick, MA (US); Loren Shure, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 1275 days.

(21) Appl. No.: 11/488,214

(22) Filed: Jul. 17, 2006

(51) Int. Cl.
G06F 9/44 (2006.01)
G06F 13/00 (2006.01)
G06F 13/28 (2006.01)

(52) U.S. Cl. ........ 717/130; 717/124; 717/127; 717/128; 711/170; 711/171; 711/172

(58) Field of Classification Search .................. 717/124, 717/130; 711/159, 170
See application file for complete search history.

(56) References Cited

U.S. PATENT DOCUMENTS

| | | | | |
|---|---|---|---|---|
| 5,644,709 A * | 7/1997 | Austin | | 714/53 |
| 6,167,535 A * | 12/2000 | Foote et al. | | 714/38 |
| 6,658,652 B1 * | 12/2003 | Alexander et al. | | 717/128 |
| 6,782,462 B2 * | 8/2004 | Marion et al. | | 711/170 |
| 6,817,011 B1 * | 11/2004 | Reynolds | | 717/130 |
| 7,234,080 B2 * | 6/2007 | Cirne et al. | | 714/38 |
| 7,257,692 B2 * | 8/2007 | Schumacher | | 711/170 |
| 7,293,142 B1 * | 11/2007 | Xu et al. | | 711/124 |
| 7,313,661 B1 * | 12/2007 | Dmitriev | | 711/159 |
| 7,325,106 B1 * | 1/2008 | Dmitriev et al. | | 711/159 |
| 7,434,206 B2 * | 10/2008 | Seidman et al. | | 717/124 |
| 7,444,484 B2 * | 10/2008 | Achanta et al. | | 711/159 |
| 7,487,321 B2 * | 2/2009 | Muthiah et al. | | 711/170 |
| 7,496,615 B2 * | 2/2009 | Broussard | | 1/1 |
| 7,577,943 B2 * | 8/2009 | Chilimbi et al. | | 717/130 |
| 7,587,709 B2 * | 9/2009 | Chilimbi et al. | | 717/130 |
| 2006/0095427 A1 * | 5/2006 | Dickenson | | 707/6 |
| 2006/0150168 A1 * | 7/2006 | Mitchell et al. | | 717/156 |

* cited by examiner

*Primary Examiner* — Thomas K Pham
(74) *Attorney, Agent, or Firm* — Nelson Mullins Riley & Scarborough LLP; Kevin J. Canning

(57) ABSTRACT

A memory profiler is provided in a programming environment. The memory profiler records memory usage information at a point of a program that runs in the programming environment. The memory profiler may record information on the amount of allocated memory, the amount of freed memory and the amount of peak memory usage. The memory profiler may also record the number of allocations and frees. The memory usage information is associated with individual points in the program so that a user can utilize this information to change the program to use less memory. With the memory usage information, the present invention enables a user to recognize how much memory is being allocated and used on behalf of a program and to track down what code is actually causing a problem in the program.

10 Claims, 5 Drawing Sheets

MEMORY PROFILING

FIELD OF THE INVENTION

The present invention relates generally to a programming environment, and more particularly to a method, system and medium for memory profiling to record memory usage information in the programming environment.

BACKGROUND OF THE INVENTION

Some programming languages or environments control the memory allocation directly and do not allow a user to control the memory allocation. Languages which handle memory allocation on behalf of a user suffer from a high level of abstraction. For example, MATLAB® allocates a block of memory and stores data in the block when a user assigns data type (a numeric, string, or structure array, for example) to a variable. In MATLAB®, memory allocation is not controlled by the user, and hence it is difficult for the user to know how much memory is being allocated and used.

Other programming languages or environments allow a user to control the memory allocation. For example, C enables a user to allocate memory for a program. The most common problems with languages that allow a user to control memory are memory leaks and memory overwrites. Leaks happen when the user forgets to explicitly free memory that they had allocated earlier. This causes the program to run out of memory. Memory overwrites happen when the user is allowed to write data into freed memory or write past the end of a block. These usually cause the program to crash or behave in unexpected ways. So, memory debugging tools for these types of languages normally provide ways to track memory leaks (unfreed memory) or memory overwrites.

C++ has properties of both types of languages. Standard C++ offers very little abstraction for memory management and when used this way it suffers from memory leaks and overwrites. But, C++ provides constructs to abstract away memory management which then makes C++ more like MATLAB®. The abstraction of the memory allocation makes it difficult for the user to recognize the memory usage patterns in the program. If a program runs out of memory or starts to use so much memory that the performance degrades, it is very difficult to track down what code is actually causing the problem.

Most operating systems have some kind of task manager or operating system calls to query overall memory usage. The operating systems do not provide memory usage information that ties back to sections of the original program.

SUMMARY OF THE INVENTION

The present invention provides a memory profiler in a programming environment. The memory profiler records memory usage information at each point of a program running in the programming environment. The memory profiler may record information on the amount of allocated memory, the amount of freed memory and the amount of peak memory usage. The memory profiler may also record the number of allocations and frees. The memory usage information is associated with individual points in the program so that a user can utilize this information to change the program to use less memory. With the memory usage information, the present invention enables a user to recognize how much memory is being allocated and used on behalf of a program and to track down what code is consuming excess memory. For example, the memory usage information can be used to detect places in the program where a loop is used to grow an array, which may cause a memory usage problem. In another example, the memory usage information can be used to handle large data sets when some operations create temporary results that are discarded once the operation is complete. For large arrays, the temporary results can also be large and cause a program to run out of memory. In this case the user can rewrite the program to eliminate or reduce the effects of large temporary results.

In accordance with one aspect of the present invention, a computer-implemented method is provided for memory profiling in a programming environment. A program is executed in the programming environment. As the program is executed, memory usage information is recorded in association with at least a point of the program.

In accordance with another aspect of the present invention, a medium is provided for holding computer executable instructions. The medium holds instructions for memory profiling in a programming environment. In memory profiling, a program is executed, and memory usage information is recorded in association with at least a point of the program.

In accordance with another aspect of the present invention, a system is provided for memory profiling in a programming environment. The system includes an execution engine for executing a program in the programming environment. The system also includes a memory profiler for recording memory usage information associated with at least a point of the program.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention provides a memory profiler for recording the memory usage information of a program in a programming environment. The memory profiler measures where a program uses memory. Using the memory profiler, a user can identify functions and individual instructions in the program that use excess memory. The user can then change the program to minimize memory usage. Memory profiling helps uncover performance problems that the user can solve by avoiding unnecessary memory consumption, and changing the program to avoid the problems.

The memory profiler records memory usage information at each point in a program running in the programming environment. The memory profiler may record information on the amount of allocated memory, the amount of freed memory and the amount of peak memory usage. The memory usage information is associated with individual points in the program so that a user can utilize this information to change the program to use less memory. In the illustrative embodiment of the present invention, the term "point" refers to a single statement or expression in the program in question. The memory usage information can be recorded on a per expression or per statement basis in the illustrative embodiment. In the illustrative embodiment, peak memory usage refers to the maximum amount of memory used by the program at a particular point. In another embodiment, peak memory usage may refer to the maximum amount of memory used over the execution of the program at that particular point.

With the memory usage information, the present invention enables a user to recognize how much memory is being allocated and used on behalf of a program and to track down what code is actually causing a problem in the program. For example, the memory usage information can be used to detect places in the program where a loop is used to grow an array.

Figure 1:
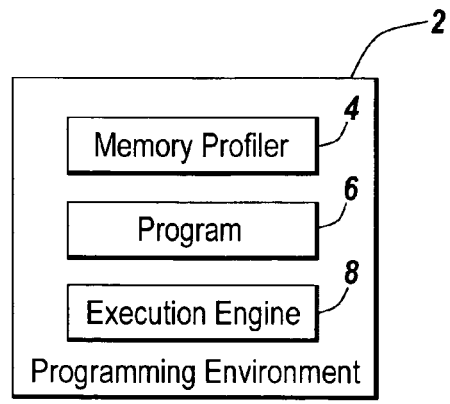
FIG. 1 depicts an exemplary programming environment suitable for practicing the illustrative embodiment of the present invention.

FIG. 1 is an exemplary programming environment 2 suitable for practicing the illustrative embodiment of the present invention. The programming environment 2 may control the memory allocation directly and may not allow a user to control the memory allocation. An exemplary programming environment 2 can be provided by MATLAB® from The MathWorks, Inc. of Natick, Mass. MATLAB® is an intuitive language and provides a technical computing environment. The MATLAB® environment integrates mathematical computing, visualization, and a powerful technical language. MATLAB® provides core mathematics and advanced graphical tools for data analysis, visualization, and algorithm and application development. MATLAB® provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, Fortran, and Java with the MATLAB® applications.

MATLAB® supports dynamically typed programming. In a dynamically typed programming environment, types are assigned to each data value in memory at runtime, rather than assigning a type to a static, syntactic entity in the program source code. The dynamically typed programming environment catches errors related to the misuse of values at the time the erroneous statement or expression is executed. In contrast, types are assigned to sets of values based on the program's source code in a statically typed programming environment. Static type disciplines operate on program source code rather than on the program execution. Therefore, in the statically typed programming environment, certain kinds of errors are detected without executing the program.

Those of ordinary skill in the art will appreciate that the MATLAB® programming environment is illustrative and the present invention may apply to other programming environments. In particular, the present invention may be useful in the programming environment that enables a user to allocate memory for a program and provides a high level of abstraction for memory allocation, such as C++.

The programming environment 2 may enable a user to generate a program 6. The programming environment 2 may include an execution engine 8 that can be invoked to run the program 6 in the programming environment 2. The memory profiler 4 may record the memory usage information of the program 6 as the program 6 is running in the programming environment 2. The profiler 4 may associate the memory usage information with a specific point of the program so that the user can recognize the memory usage pattern of the program 6. The profiler 4 is described below in more detail with reference to FIGS. 4 and 5.

One of ordinary skill in the art will also appreciate that the programming environment 2 may be provided on the same device, which will be described below in more detail with reference to FIG. 2, or alternatively, the programming environment 2 may be provided in a network environment, which will be described below in more detail with reference to FIG. 3.

Figure 2:
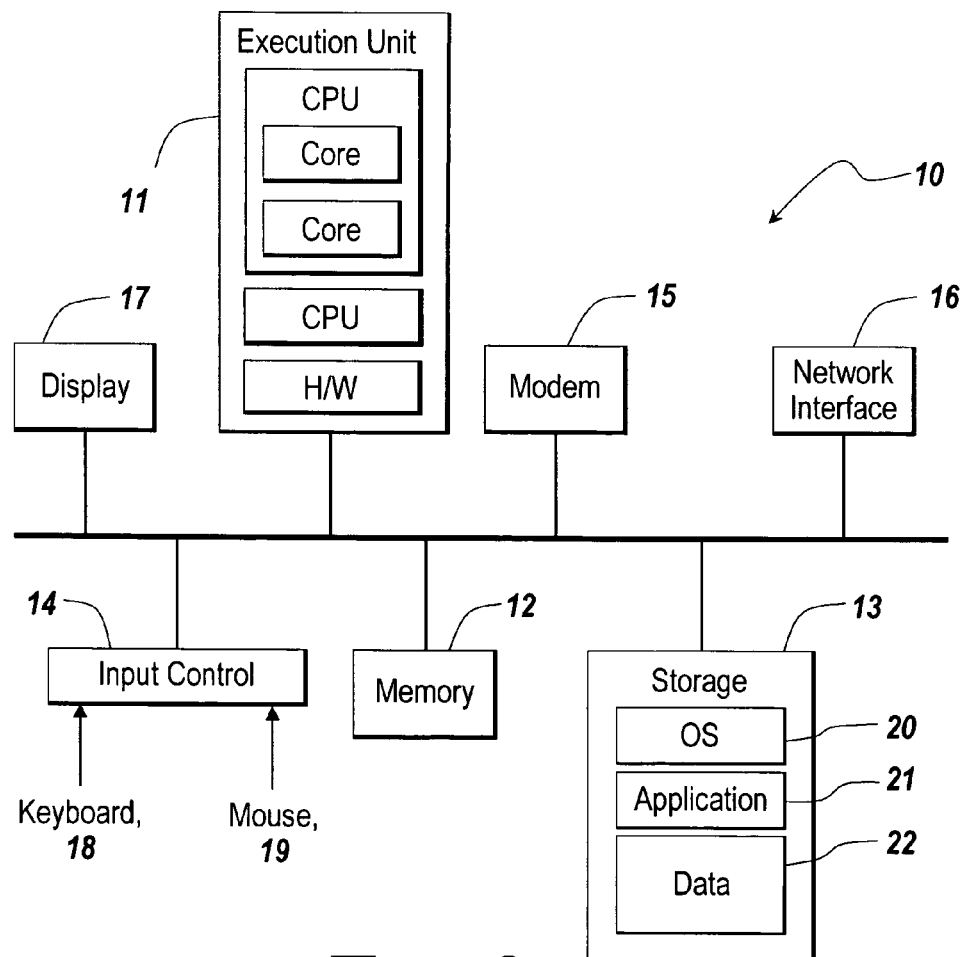
FIG. 2 is an exemplary computing device for implementing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, a display 17, etc. The execution unit 11 controls each component of the computing device 10 to provide the programming environment 6. The memory 12 temporarily stores instructions and data and provides them to the execution unit 11 so that the execution unit 11 operates the computing device 10.

Optionally, the computing device 10 may include multiple Central Processing Units (CPUs) for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC).

The storage 13 usually contains software tools for applications. The storage 13 includes, in particular, code 20 for the operating system (OS) of the device 10, code 21 for applications running on the operation system including the programming environment 6, and data 22 of the memory usage information. Those of ordinary skill in the art will appreciate that the application can be stored in the memory 12 as well, much like the data, and even the OS, or they can be stored on the network described below with reference to FIG. 3.

The input control 14 may interface with a keyboard 18, a mouse 19, and other input devices. The computing device 10 may receive through the input control 14 input data, such as the program 6. The computing device 10 may display on the display 17 user interfaces 9 for displaying the program 6 and the memory usage information generated by the memory profiler 4.

Figure 3:
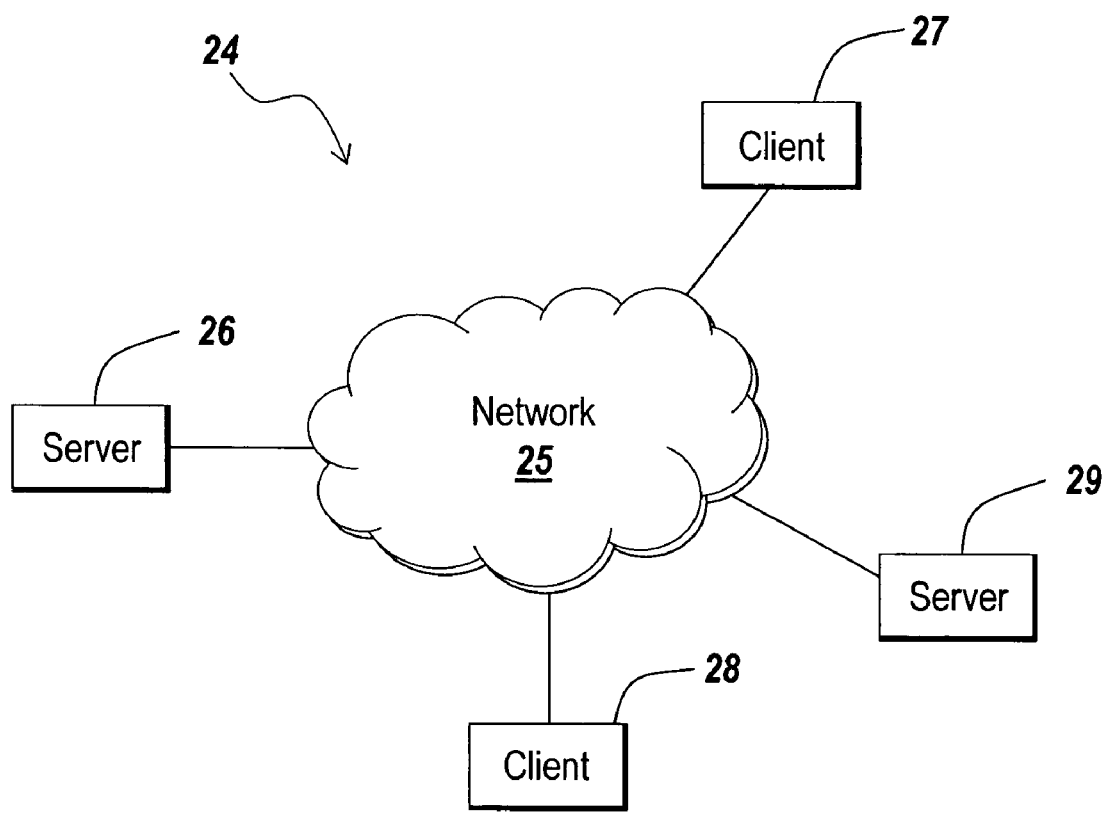
FIG. 3 is an exemplary network environment that enables an online implementation of the present invention.

FIG. 3 is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 24, the client 28 may generate the program 6 and send the program 6 to the server 26 for execution. The server 26 may include the execution engine 8 and memory profiler 4 to run the program and record the memory usage information of the program 6. The server 26 may then return the memory usage information to the client 28 and the client 28 may use the information to change the program 6. In another embodiment, the execution engine 8 and memory profiler 4 may reside in the servers 26 and 27, respectively, and be coupled to each other through the communication network 25. The servers 26 and 27 may communicate with each other through the communication network 25.

Figure 4:
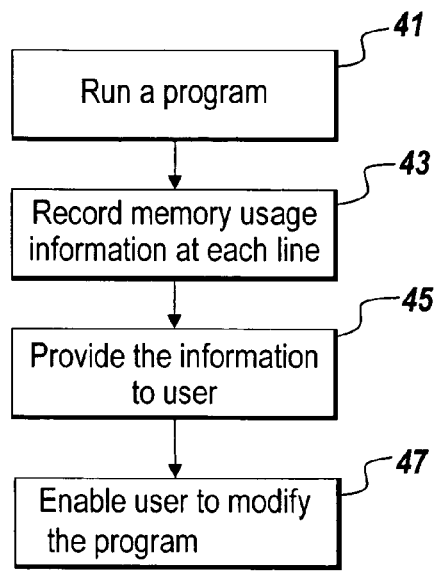
FIG. 4 is a flow chart showing an exemplary operation of the illustrative embodiment of the present invention.

FIG. 4 is a flow chart showing an exemplary operation of the illustrative embodiment of the present invention. The program 6 can be executed by the execution engine 8 (step 41). In each point of the program, such as each line of the program 6, the memory profiler 4 measures the amount of memory used, the amount of memory freed and the peak memory usage (step 43). The memory usage information may be provided in the bin for each instruction statement of the program. The bin may have the following vector format to provide memory usage information.

m=[amount of memory used, amount of memory freed, amount of peak memory usage]

For illustrative purposes, it is assumed that the following portion of a program is executed in the programming environment 2.

$$\text{Function } x = goo$$
$$x = ones(1000);$$
$$x = 1;$$
$$\vdots$$

The first line of the program defines a function and its name. At this point of the program, the memory profiler 4 may initialize the memory usage information bin m to m=[0, 0, 0]. The second line of the program creates a 1000*1000 array with ones (1's) and assigns the array to the variable x. If 8 bytes are allocated to each element of the array, the memory profiler 4 updates the memory usage information bin m to m=[8,000,000, 0, 8,000,000] at this point in the program. The third line of the program assigns an integer value of one (1) to the variable x. If 8 bytes are allocated to the value, the memory profiler 4 updates the memory usage information bin m to m=[8, 8,000,000, 0] at this point in the program. The memory profiler 4 can be implemented in C/C++ code or other programming languages to provide the memory usage information of a program. The following is exemplary C/C++ code for the memory profiler 4.

Amount of memory used
{
P=malloc(required-size);
peak_allocated+=size(P);
total_allocated+=size (P);
update_peak( )
}
Amount of memory freed
{
update peak ( );
peak_freed+=size(P);
total_freed+=size(P);
free (P);
}
update_peak( )
{
if (peak_allocated>peak_freed)
{
peak=max(peak, (peak_allocated–peak_freed);
}
}

In the illustrative embodiment, peak_allocated and peak_freed are reset to zero every time a program point is executed. In another embodiment in which peak memory refers to the maximum amount of memory used relative to the entire program, peak_allocated and peak_freed are reset to zero when the profiler starts. Those of ordinary skill in the art will appreciate that the above C/C++ code is exemplary and the memory profiler 4 can be implemented with different code or different programming language. The memory profiler 4 may hook in the interpreter of the program that interprets the program to execute in the programming environment 2. The memory profiler 4 can update the memory usage information bins as the program executes.

The memory profiler 4 may record the memory usage information bin m at each point of the program and provide the recorded information to the user (step 45). The recorded information may be provided to the user in various ways including a text-based format and a graphical format. For example, the recorded information can be displayed in a table in which the rows display the measuring points of the program and the columns display the memory usage information bins at the measuring points. In another example, the recorded information can be displayed in a bar graph where a bar may indicate the amount of memory used or freed at each measuring point. In particular, the recorded information can be plotted with respect to time so that the user can easily recognize the memory usage pattern of the program with respect to time as the program is executed in the programming environment 2.

Figure 5:
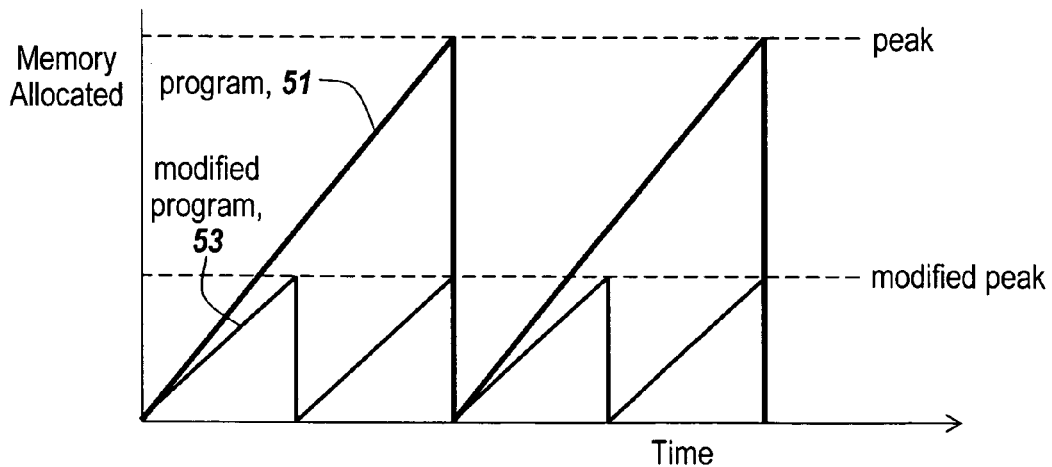
FIG. 5 shows exemplary plots of memory usage information with respect to time.

The user may be enabled to modify the program based on the information provided by the memory profiler 4 (step 47). Using the information provided in the memory usage bin, the user can find each point of the program that consumes excess memory in the program. The user may also run the memory profiler 4 on the modified program and compare the memory usage information of the original program and the modified program. FIG. 5 shows exemplary plots of the amount of allocated memory of an original program 51 and a modified program 53 with respect to time. The first plot 53 shows the amount of allocated memory of the original program with respect to time. The first plot 51 shows that the original program has a relatively high peak memory usage. The user can change the original program to reduce the peak memory usage based on the memory profiling information. The second plot 53 shows the amount of allocated memory of the modified program with respect to time. The modified program has a lower peak memory usage than the original program.

Figure 6:
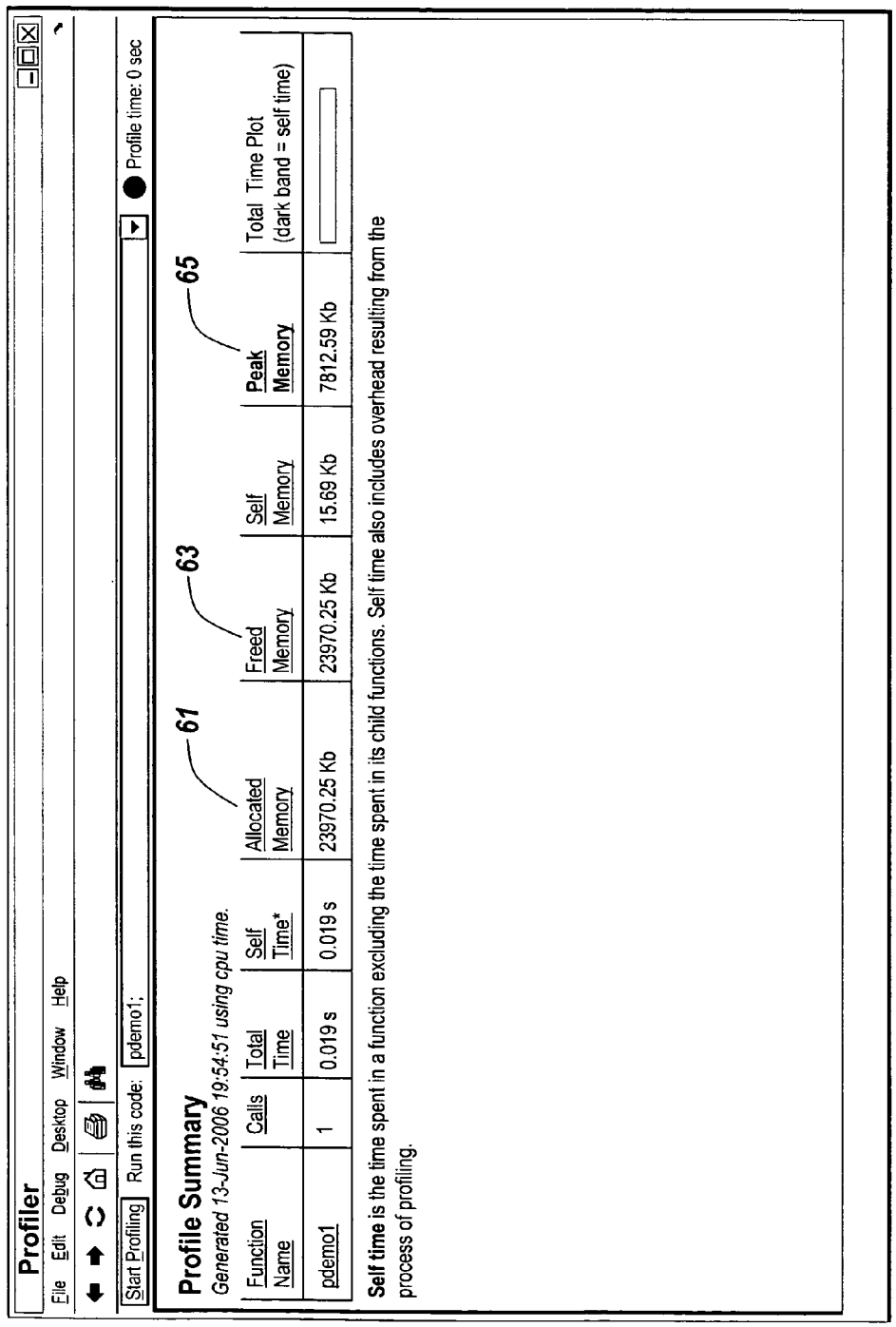
FIGS. 6 and 7 show views of an exemplary memory profile summary generated in the illustrative embodiment.
Figure 7:
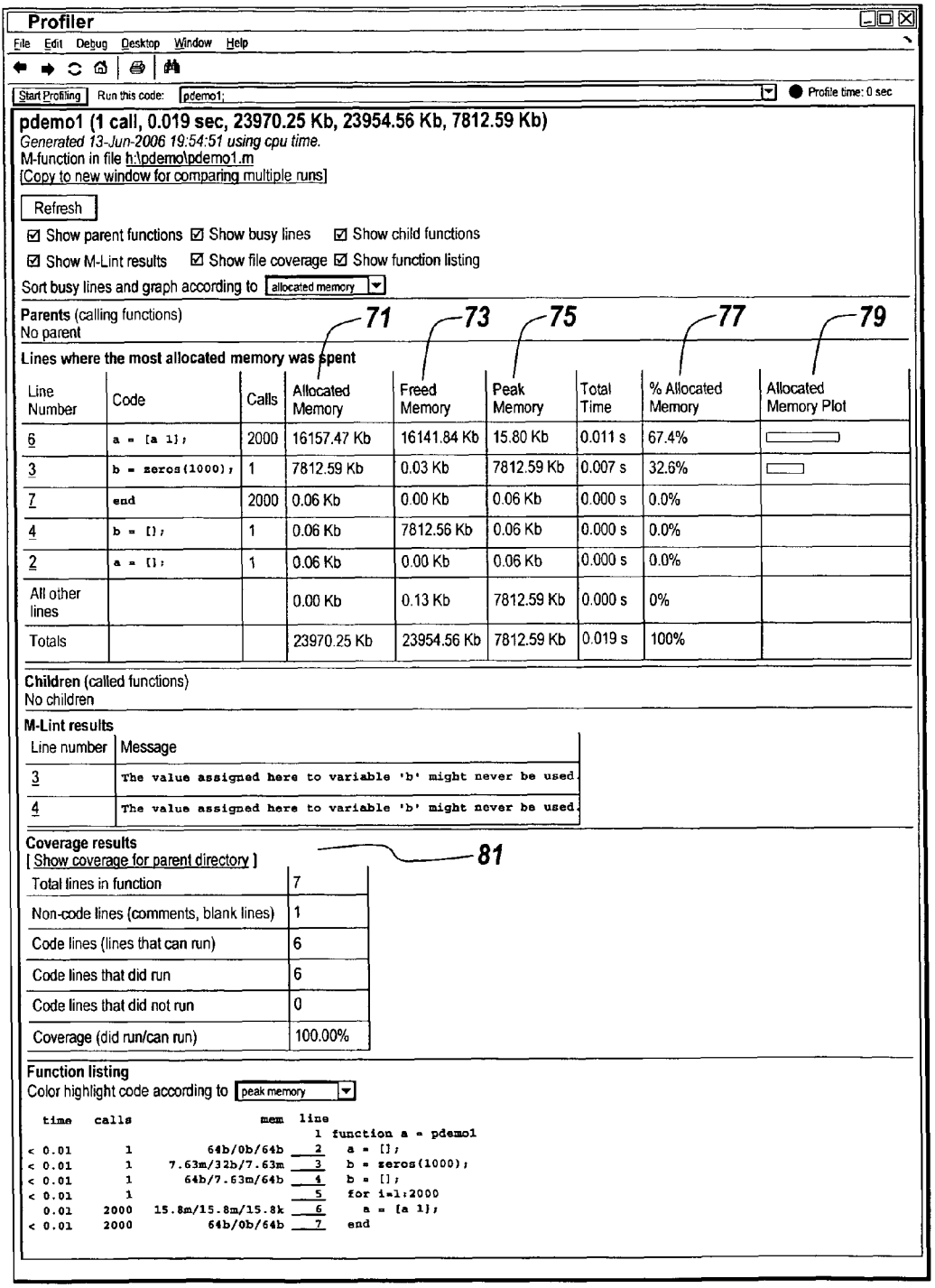

FIGS. 6 and 7 show different views of an exemplary memory profile summary generated in the illustrative embodiment. The memory profile summary is generated by the memory profiler 4 operating on the following program.

function a=pdemo1
a=[ ];
b=zeros(1000);
b=[ ];
for i=1:2000
a=[a 1];
end

FIG. 6 shows the memory usage information of the function "pdemo1" including allocated memory 61, freed memory 63 and peak memory 65. FIG. 7 shows the memory usage information of the points in the function "pdemo1" including allocated memory 71, freed memory 73, peak memory 75, percentage of allocated memory and allocated memory plot 79. The memory usage information is provided for each line in the function "pdemo1." The profile data may also be provided with code coverage results 81 showing the total code lines in the function, the code lines that did run, the code lines that did not run, etc. When used in conjunction with code coverage results 81, the memory profiling data can be used to detect places in the code that may run out of memory.

Although the illustrative embodiment of the present invention is described relative to memory profiling, the basic concept of the present invention may be extended to any other measurable quantities, such as I/O operations, graphics operations, memory cache hits/misses, etc. For example, the I/O operations can be profiled to record the detailed information on the I/O operations conducted in a program so that a user can debug the program to make sure that the program has correct I/O operations as desired.

Certain embodiments of the present invention are described above. It is, however, expressly noted that the present invention is not limited to these embodiments, but rather the intention is that additions and modifications to what is expressly described herein also are included within the scope of the invention. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for memory profiling in a programming environment, the method comprising:
   executing a program in the programming environment; and
   recording memory usage information associated with at least a point of the program, wherein the point of the program is a single statement or expression in the program, and the memory usage information includes at least an amount of memory allocated, an amount of memory freed, an amount of peak memory usage at the point in the program, a number of allocations and a number of frees at the point of the program.

2. The method of claim 1, further comprising:
displaying the memory usage information to a user.

3. The method of claim 1, further comprising:
enabling a user to modify the program based on the memory usage information.

4. A medium holding computer executable instructions for memory profiling memory, the instructions including instructions for:
   executing a program in the programming environment; and
   recording memory usage information associated with at least a point of the program, wherein the point of the program is a single statement or expression in the program, and the memory usage information includes at least an amount of memory allocated, an amount of memory freed, an amount of peak memory usage at the point in the program, a number of allocations and a number of frees at the point of the program.

5. The medium of claim 4, further comprising instructions for:
displaying the memory usage information to a user.

6. The medium of claim 4, further comprising instructions for:
   enabling a user to modify the program based on the memory usage information.

7. A system for memory profiling in a programming environment, the system comprising:
   an execution engine for executing a program in the programming environment; and
   a memory profiler for recording memory usage information associated with at least a point of the program, wherein the point of the program is a single statement or expression in the program, and the memory usage information includes at least an amount of memory allocated, an amount of memory freed, an amount of peak memory usage, a number of allocations and a number of frees at the point of the program.

8. The system of claim 7, further comprising:
a client for generating the program; and
a communication network for coupling the client to a server that includes at least one of the execution engine and the memory profiler.

9. The system of claim 7, wherein the execution engine is coupled to the memory profiler through the communication network.

10. A computer-implemented method for memory profiling in a programming environment, the method comprising:
   providing a request for memory profiling of a program; and
   in response to the request, executing the program to record memory usage information associated with at least a point of the program, wherein the memory usage information is returned to a requester, wherein the point of the program is a single statement or expression in the program, and the memory usage information includes at least an amount of memory allocated, an amount of memory freed, an amount of peak memory usage at the point in the program, a number of allocations and a number of frees at the point of the program.

* * * * *